United States Patent

[11] 3,633,784

| [72] | Inventor | William G. Taft |
| | | Pittsburgh, Pa. |
| [21] | Appl. No. | 704,416 |
| [22] | Filed | Feb. 9, 1968 |
| [45] | Patented | Jan. 11, 1972 |
| [73] | Assignee | Westinghouse Electric Corporation |
| | | Pittsburgh, Pa. |

[54] HYDROSTATIC REACTOR CAVITY SEAL
7 Claims, 4 Drawing Figs.

[52] U.S. Cl................................................. 220/13,
 220/14, 176/87, 176/38
[51] Int. Cl........................................................ A47j 27/10
[50] Field of Search............................................ 176/37, 38,
 87; 220/3, 15, 55 D, 55 F, 13

[56] References Cited
UNITED STATES PATENTS

| 1,519,766 | 12/1924 | DeMuth | 220/55 F UX |
| 2,983,659 | 5/1961 | Treshow | 176/87 X |
| 3,270,906 | 9/1966 | Christensen | 220/3 |
| 3,445,971 | 5/1969 | Desmarchais et al. | 220/3 X |

*Primary Examiner*—Reuben Epstein
*Attorneys*—A. T. Stratton and Z. L. Dermer

ABSTRACT: A reactor cavity seal comprises a large flat ring used to cover and seal the annulus around the reactor vessel during the refueling time period in which the area is flooded with water. The seal is effected by compressing large diameter O-rings between the flat ring and machined surfaces on the reactor vessel and on a ring set in the surrounding concrete. The O-rings are compressed by using the hydrostatic pressure of the water above the seal ring. Because an absolute seal must be maintained at all times during refueling, auxiliary clamps are utilized to provide the seal compression force required during the low water pressure periods when the refueling canal is being flooded or being drained. These clamps are also utilized to lift and support the seal ring a sufficient distance above the seal surface during plant operation to permit the flow of reactor cavity cooling air.

INVENTOR
William G. Taft

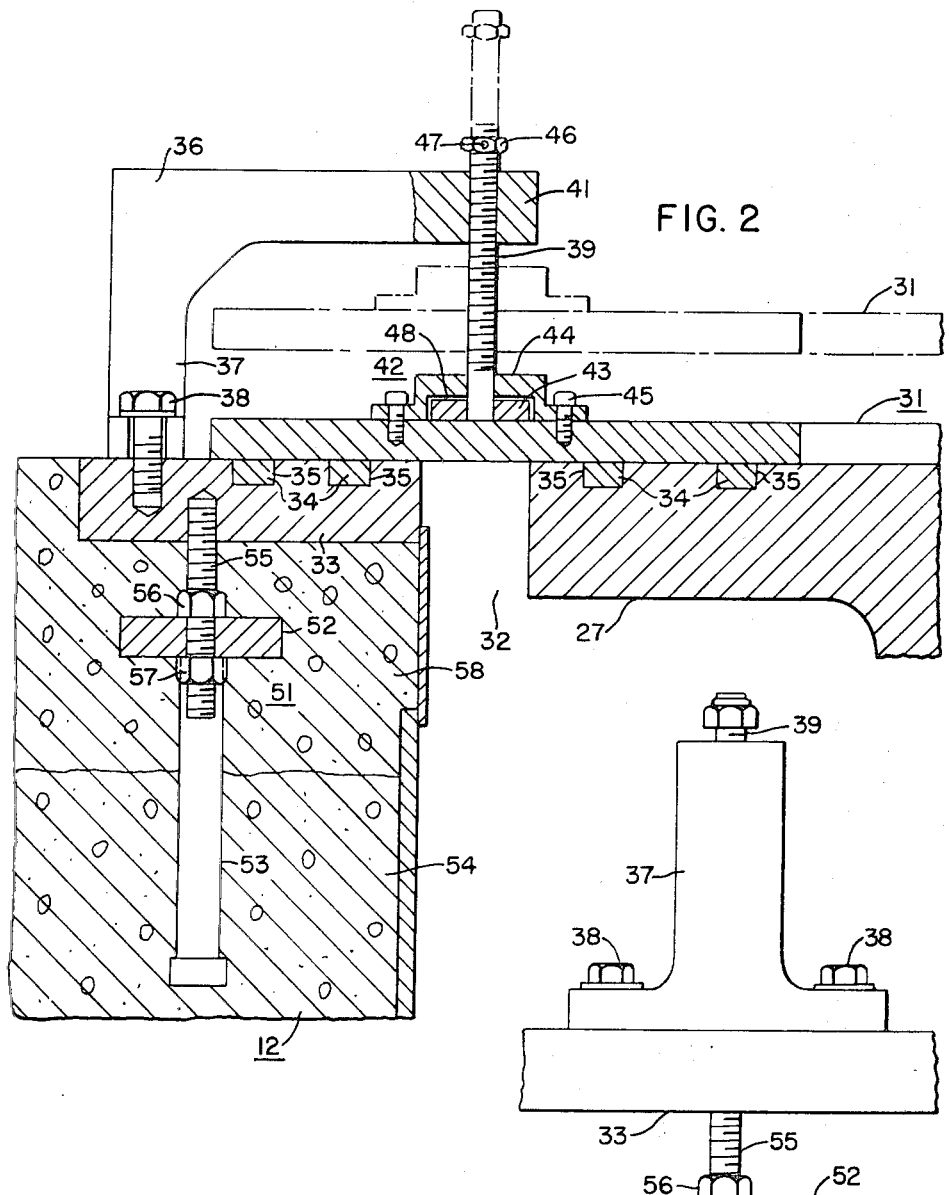

> # 3,633,784

HYDROSTATIC REACTOR CAVITY SEAL

BACKGROUND OF THE INVENTION

This invention relates to hydrostatic seals, particularly to seals for cavities in the containment structure for nuclear reactor vessels.

Prior reactor cavity seals consisted of a large flat steel ring the inside of which was bolted to a machined ledge on the reactor vessel and compressed two O-rings gaskets. The outside of the ring was bolted to a machined ring set in concrete surrounding the reactor vessel and compressed two similar O-ring gaskets. During refueling, the gaskets compressed by the bolt clamping force retained approximately a 24-foot head of refueling water. During plant operation, the bolts were removed and the seal ring raised about 2 inches and set on blocks to permit cooling air to flow from the reactor cavity.

The prior seal required matching bolt holes to be machined in the seal ring to mate with threaded holes in the reactor vessel seal ledge and in the ring set in concrete. This required close tolerances on large dimensions. The bolting down of the seal ring during plant refueling and the lifting of the seal ring during plant operation to permit cooling airflow required installation of a large number, for example 240, of bolts and sealing washers to seal the cavity and removal of the bolts and washers to permit lifting the seal ring. This time consuming operation was required for each refueling period. During the plant operation cycle, the seal ring was lifted off the seal surface leaving 240 unprotected threaded holes vulnerable to damage and corrosion.

An object of this invention is to provide an effective seal between a reactor vessel and surrounding concrete of the containment for the reactor without utilizing a seal of the bolted gasket type.

Another object of the invention is to utilize the hydrostatic pressure of the water above the seal ring to provide the force for adequate seal compression to effect the seal.

Other objects of the invention will be explained fully hereinafter or will be apparent to those skilled in the art.

SUMMARY OF THE INVENTION

In accordance with one embodiment of the invention, a reactor cavity seal comprises a large flat seal ring which is held to the reactor vessel seal ledge and a machined outer support ring set in the surrounding concrete, by a plurality of generally C-shaped clamps mounted on the outer support ring. Each clamp includes a generally L-shaped bracket bolted to the outer support ring and a threaded stud with a swivel end that bears on the center of the cross section of the seal ring, thereby distributing the clamp force, provided by the threaded stud, to compress O-ring seals in both the vessel seal ledge and the outer ring. Although the clamps provide a force adequate to compress the seals sufficiently to seal against slightly more than half the water depth during refueling of the reactor, the basic force, providing the seal compression to seal against the refueling waterhead, is provided by the hydrostatic pressure of the water spread over the large flat seal ring area. Thus, the clamps are required only to assure an absolute seal for the first few feet of water during the flooding or the draining operation. The clamps are also utilized to lift and support the seal ring during plant operation to permit reactor cavity cooling airflow.

BRIEF DESCRIPTION OF THE DRAWING

For a better understanding of the nature and objects of the invention, reference may be made to the following detailed description, taken in conjunction with the accompanying drawing, in which:

FIG. 2 is an enlarged fragmentary view, partly in section and partly in elevation, showing one of the clamps utilized in the structure of FIG. 1;

FIG. 3 is an enlarged view, in end elevation, of one of the clamps, and

DESCRIPTION OF PREFERRED EMBODIMENT

Figure 1:
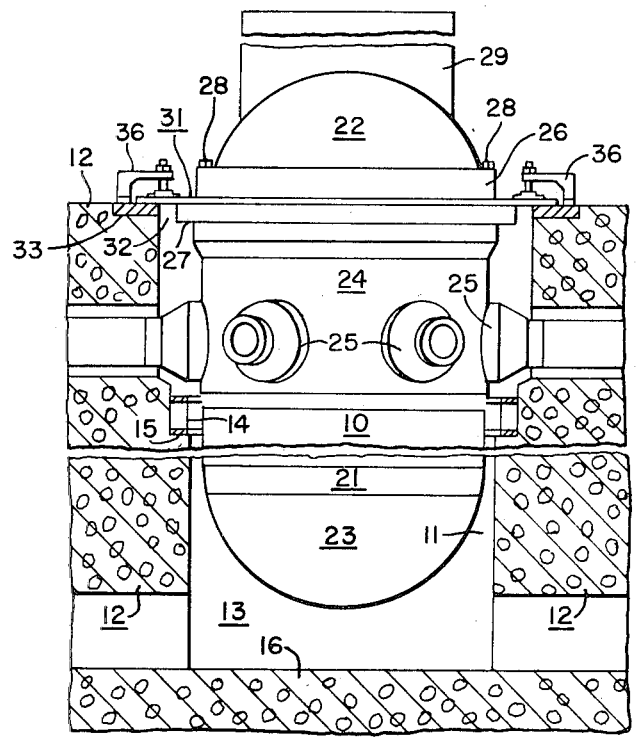
FIG. 1 is a view, partly in elevation and partly in section, of a reactor vessel and a portion of the containment for the vessel embodying principal features of the invention.

In FIG. 1 of the drawings, a nuclear reactor vessel 10 is positioned in a generally circular well or cavity 11 in a concrete enclosure 12 surrounding the vessel 10. As shown, the vessel 10 is spaced from the wall of the cavity 11. A ventilating passageway 13 is provided in the concrete enclosure 12 at the bottom of the cavity 11. The vessel 10 is supported by a ring girder 14 secured to the vessel and resting on a ledge 15 in the concrete enclosure 12. Thus, the lower end of the vessel 10 is disposed above a floor 16 to provide a space between the bottom of the vessel and the floor. The concrete enclosure 12 constitutes part of the secondary containment for a nuclear power system for which the reactor is the source of energy. The secondary containment is provided to prevent the escape of radioactive material into the surrounding atmosphere.

The reactor shown is of pressurized liquid type. The vessel 10 has a generally cylindrical body 21, a generally hemispherical upper head or end 22 and a generally hemispherical lower end 23. The body 21 includes a nozzle section 24 having a plurality of nozzles 25 therein for connecting the piping for the primary loop of the reactor power system. The lower end 23 may be welded to the cylindrical body 21. Likewise, the nozzle section 24 may be welded to the body 21. The upper end 22 has a bolting flange 26 which is bolted to a flange or ledge 27 on the nozzle section 24 by means of a plurality of head bolts 28. A control rod drive mechanism housing 29 is mounted on top of the end 22. Control rod ports (not shown) are provided in the upper head or end 22. Likewise, instrumentation ports (not shown) are provided in the lower end 23. Suitable insulating material (not shown) may be provided on the outer surface of the reactor vessel 10.

As explained herein before, the interior of the containment structure 12 is flooded with water during refueling of the reactor. In order to prevent the water from entering the cavity 11 and damaging the instrumentation and the vessel insulation, a flat seal ring 31, preferably steel, is disposed to span the space 32 between the ledge 27 on the reactor vessel and the wall of the cavity 11 in the concrete containment structure 12. As shown, the ring 31 is mounted on the ledge 27 around the bolting flange 26 and is of sufficient width to overlap a portion of the metal outer support ring 33 which is set in the surrounding concrete structure 12. The upper surface of the ledge 27 is machined to provide a flat surface. Likewise, the upper surface of the outer support ring 33 is machined to provide a flat surface. As shown in FIG. 2, relatively large diameter O-ring seals 34 are disposed in grooves 35 in the upper surfaces of the vessel ledge 27 and the outer support ring 33.

Figure 4:
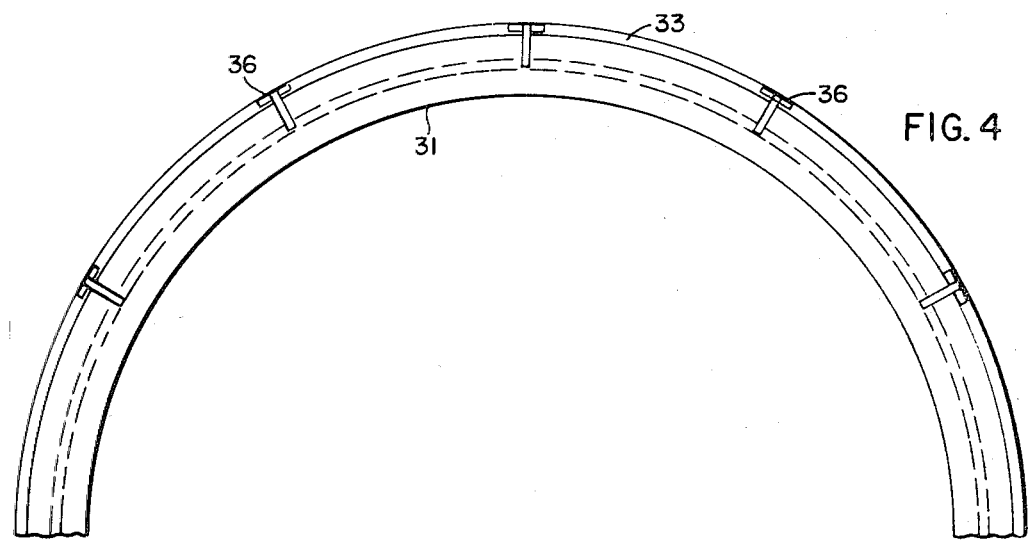
FIG. 4 is a view, in plan, of one-half of the seal ring, the other half being symmetrical with the portion shown.

As shown more clearly in FIG. 2, the seal ring 31 is compressed against the O-rings 34 by means of a plurality, for example 12 of generally C-shaped clamps 36 mounted on the outer support ring 33. Each clamp comprises an L-shaped bracket having one leg 37 attached to the ring 33 by two bolts 38. A stud 39 is threaded through the other leg 41 of the clamp 36. The lower end of the stud 39 is attached to the seal ring 31 by a swivel connection 42 comprising a pressure plate 43 secured to the lower end of the stud 39, as by welding, and a cover 44 attached to the seal ring 31 by a plurality of bolts 45. A nut 46 secured to the upper end of the stud 39 by a pin 47 may be utilized to rotate the stud by means of a wrench or other suitable tool. In this manner pressure is applied on the center of the cross section of the steel ring 31, thereby distributing the clamp load provided by the threaded stud to compress the O-ring seals 34. The contour of the seals 34 is such that effective sealing pressure is attained without the high clamping force previously required. As shown in FIG. 4, the clamps 36 may be equally spaced around the seal ring 31.

During the refueling period when the reactor cavity is sealed, the area is flooded with water to a depth of approximately 24 feet. The basic sealing force, that force required to compress the O-ring seals, is provided by the hydrostatic pressure of the water acting over the large flat seal ring area. This downward force is balanced by the seal pressure exerting an upward force over a relatively small area. The ratio of the net effective area over which the hydrostatic pressure of the water exerts a downward force to that area over which the O-ring seals exert an upward force is always greater than 5.

The seal contour is designed to provide a seal pressure to water pressure ratio equal to a minimum of 5 for the entire range of water depth. Theoretically, this pressure ratio approaches infinity as the water depth approaches 0 because the seal pressure must support the weight of the seal ring. Therefore, it is positive without the force exerted by the water.

In practice, due to the relatively small deflection of the seals and the possibility that practical machining tolerances may exceed the initial seal deflections, the auxiliary seal compression clamps 36 have been added. This is necessary to assure a positive seal at all times when the area is flooded, especially during that time period in which there is insufficient water depth to cover the seal ring.

In order to lift the seal ring 31 off of the seal surfaces and support it in the raised position during plant operation to permit cooling air to flow through the cavity 11, the swivel connection 42 is constructed to enable the ring 31 to be raised to the position shown by the dot-dash lines in FIG. 2 by means of the studs 39 in the clamps 36. When each stud 39 is rotated in a direction to raise its pressure plate 43 against the cover 44, the seal ring 31 is raised. It will be noted that sufficient space 48 is provided between the pressure plate 43 and the cover 44 to permit the hydrostatic pressure of the water to compress the seal ring 31 against the O-rings 34 without being restricted by the pressure plate 43 and the stud 39.

As shown more clearly in FIGS. 2 and 3, the outer metal ring 33 may be leveled to align with the ledge 27 on the reactor vessel 10 by means of a plurality of adjustable supports 51 embedded in the concrete structure 12. These supports 51 may be spaced around the ring 33 at positions corresponding to the positions of the clamps 36. Each support 51 comprises a crossmember 52 and two studs 53 secured to the crossmember 52. During construction, the studs 53 may be embedded in a lower portion 54 of the concrete structure 12 which is poured first and allowed to set. The ring 33 is then supported and properly leveled by means of studs 55 each one of which is adjustably positioned in a crossmember 52 by means of nuts 56 and 57 threaded on the stud 55 above and below the crossmember 52. The upper end of each stud 55 is threaded into the metal ring 33. After the ring 33 is properly leveled the upper portion 58 of the concrete structure 12 may be poured to embed the crossmembers 52.

From the foregoing description it is apparent that the invention eliminates the difficult and expensive machine of bolt holes between the reactor vessel and the cavity seal ring required with prior structures. The time required to install and remove the seal is reduced. Since this operation is required during each refueling period a saving is made possible for each plant. The auxiliary clamps perform the dual function of providing a clamping force to maintain an effective seal during the refueling operation and of lifting and supporting the seal ring in a raised position during plant operation to permit the proper circulation of cooling air.

Since numerous changes may be made in the above-described construction and different embodiments of the invention may be made without departing from the spirit and scope thereof, it is intended that all subject matter contained in the foregoing description or shown in the accompanying drawings shall be interpreted as illustrative and not in a limiting sense.

I claim as my invention:

1. In a nuclear reactor containment which is flooded with liquid during refueling of the reactor, in combination, an enclosing structure having a generally circular cavity therein, an open ended reactor vessel disposed in the cavity and spaced from the wall of the cavity, a cover means for said vessel, an inner annular seal surface on the vessel, an outer annular seal surface on the enclosing structure, a generally flat seal ring disparate from said cover means spanning the space between the vessel and the cavity wall, a plurality of clamps for compressing the seal ring against said inner and outer seal surfaces, and said clamps being operable to lift the seal ring from said surfaces and support it in the raised position during operation of the reactor.

2. The combination defined in claim 1, including compressible seal rings disposed in said inner and outer surfaces underneath the flat seal ring.

3. The combination defined in claim 2, wherein the area of the flat seal ring exposed to the hydrostatic pressure of the liquid in the containment is greater than the area engaged by the compressible seal rings to enable the liquid pressure to assist the clamps in compressing the flat seal ring against the inner and outer seal surfaces.

4. The combination defied in claim 1, wherein the outer seal surface includes a metal ring mounted on the enclosing structure.

5. The combination defined in claim 4, wherein the clamps are attached to said metal ring.

6. The combination defined in claim 4, wherein each clamp comprises a generally L-shaped bracket having one leg attached to the metal ring, and a stud threaded through the outer leg to engage the flat seal ring.

7. The combination defined in claim 6, wherein one end of the stud is attached to the flat seal ring with a swivel connection.

* * * * *